June 23, 1936.  K. F. J. KIRSTEN ET AL  2,045,233
PROPELLER FOR AIRCRAFT
Filed Aug. 17, 1934   2 Sheets-Sheet 1
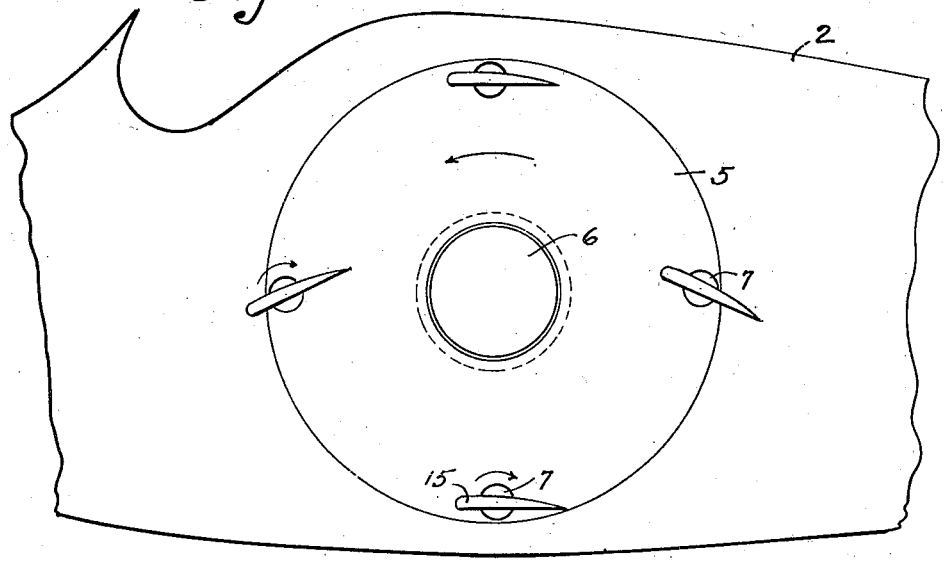
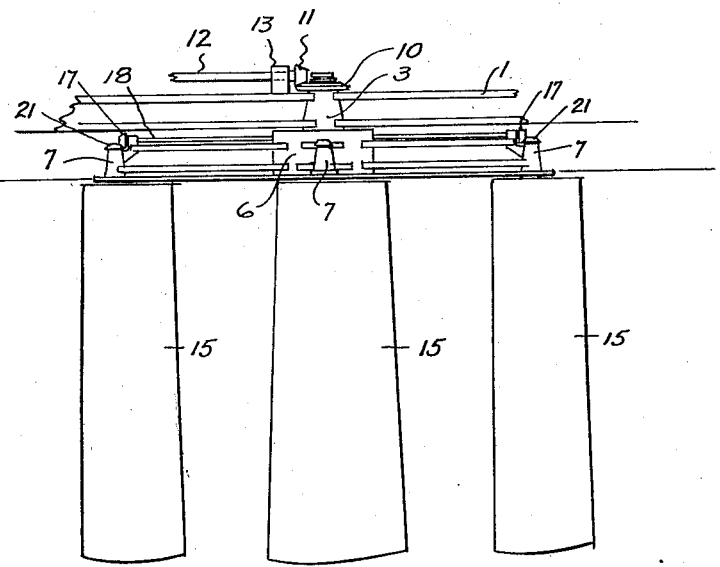
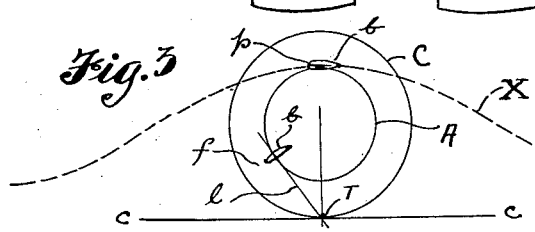
INVENTOR
KURT F. J. KIRSTEN
HERBERT M. HEUVER
BY
ATTORNEY

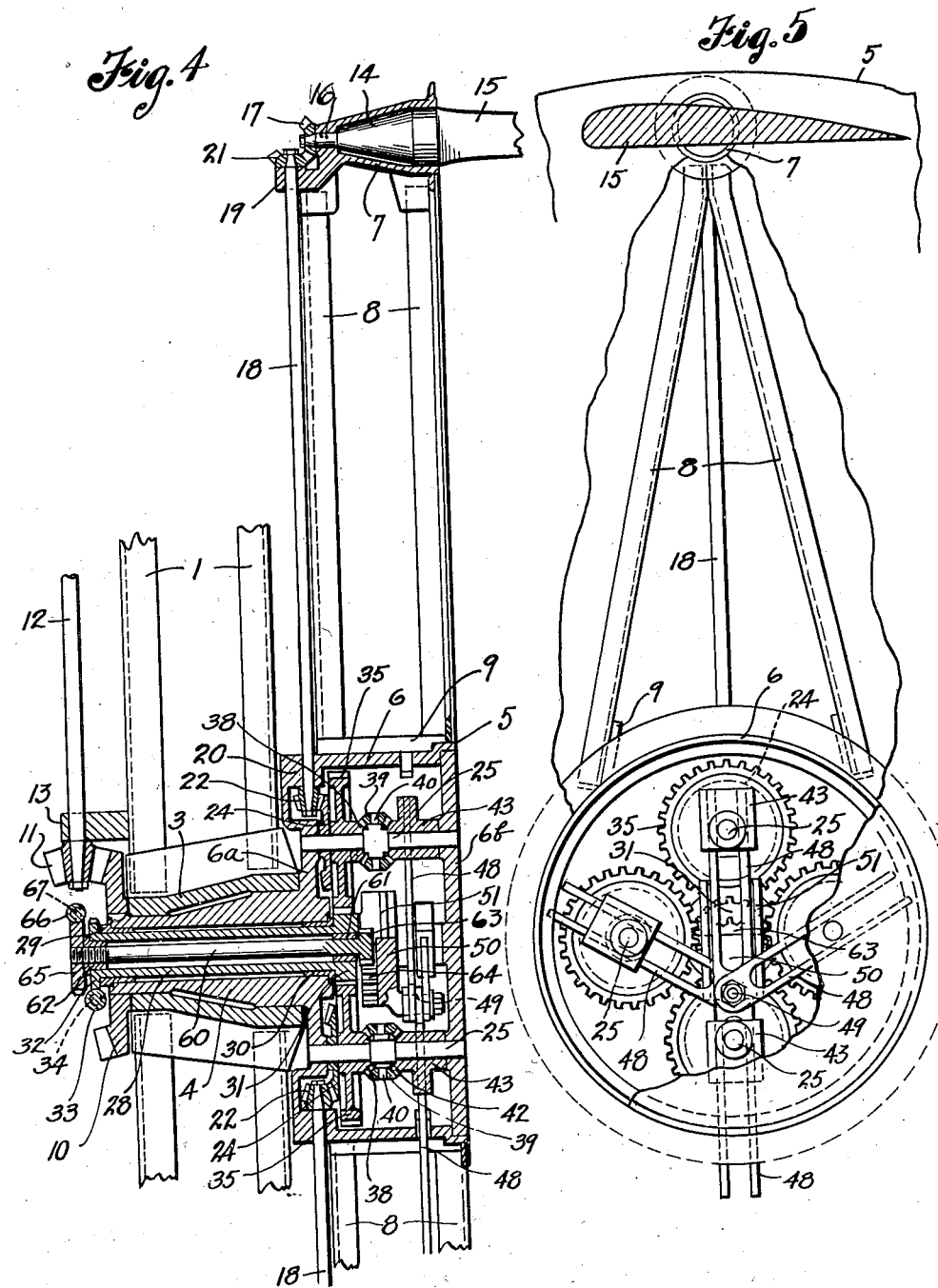

Patented June 23, 1936

2,045,233

UNITED STATES PATENT OFFICE 2,045,233

PROPELLER FOR AIRCRAFT

Kurt F. J. Kirsten and Herbert M. Heuver, Seattle, Wash.

Application August 17, 1934, Serial No. 740,226

6 Claims. (Cl. 170—148)

This invention relates to aircraft propulsion and more particularly to aircraft propellers of that class known in the art as "cycloid propellers" wherein a plurality of propeller blades extend normal to the surface of a rotor, and wherein any point in the axis of any blade will describe the path of a prolate cycloid, when the slip of the propeller is zero, and wherein the blades rotate in their mountings in accordance with the rotation of the rotor to so aline themselves that the planes of their median chords remain tangent to the prolate cycloid.

Explanatory to the invention it will here be stated that the most important consideration in the design of a cycloidal propeller is the required pitch. The pitch ratio of a screw propeller has been defined as the advance per revolution in propeller diameters of the screw as a whole at zero slip. Applying the same definition to cycloidal propellers, the pitch ratio of a pure cycloidal propeller is pi, since the length of a cycloid period is equal to pi times the diameter of the generating circle. A cycloidal path is described by a point on the periphery of a wheel which rolls on a plane. The distance covered by the center of the wheel, or the wheel as a whole, per revolution is pi times the diameter; hence the pitch ratio of a cycloidal propeller representing the blade orbit as the rim of a wheel and rolling on a plane tangent to the blade orbit is pi or the advance per revolution of the propeller as a whole in orbit diameters.

The curve generated by a point on the periphery of a wheel rolling on a plane is the path of a pure cycloidal curve. If, however, this wheel were attached concentrically to a smaller wheel rolling on a plane, a point on the periphery of the larger wheel would generate a curtate cycloidal curve. Likewise, if this wheel is attached concentrically to a larger wheel rolling on a plane, a point on the periphery of the smaller wheel will generate a prolate cycloidal path. Hence cycloidal propellers may be grouped into three classes, viz; the pure, the prolate and the curtate.

In the cycloidal propeller the alinement of blades at all points along the cycloidal path for zero slip must be such that no force reaction normal to the path can result. This naturally requires a different blade movement for the curtate cycloid than for the pure cycloid or prolate cycloid. For the prolate cycloidal propeller, to which the present invention applies, the blades must rotate about their own axes at the same speed as the propeller rotor, or while the propeller rotor makes one revolution the blade must also make a full revolution. However, a uniform blade rotation is feasible only for the pure cycloidal propeller, for the prolate cycloidal propeller modifications must be applied to the blade actuating mechanism so that the blade alinement is correct for all points on the cycloidal path. It must have a blade rotational speed equal to that of the rotor, but this rotational speed must be retarded until the cycloid intersects a plane parallel to the plane on which the generating circle rolls and located at a definite distance above that plane. For the remainder of the half cycle the rotational speed of the blades must be increased.

In view of the above it has been the principal object of this invention to provide a suitable and practical blade control mechanism for propellers of the prolate cycloid type whereby rotational speed of the blades may be controlled as above stated; thereby to change and control the pitch by an oscillating adjustment of the blades in their mountings effected automatically incident to rotation of the rotor.

Another object of the invention resides in the combination and arrangement of parts whereby the change and control of pitch and axis of symmetry may be effected with the propeller in motion.

Other objects of the invention reside in the details of construction and in the combination of parts and in their mode of operation, as will hereinafter be described.

In accomplishing the various objects of the invention, we have provided the improved details of construction, the preferred forms of which are illustrated in the accompanying drawings wherein—

Fig. 1 is a side elevation of a portion of an airplane equipped with a cycloidal propeller embodying the present invention.

Fig. 2 is a top, or plan, view of the parts, as seen in Fig. 1.

Fig. 3 is a diagram for purpose of explanation and illustration of operation of the present prolate cycloidal propeller.

Fig. 4 is a cross sectional view in the axial planes of the rotor and a blade mounted thereby, particularly illustrating the means for changing and controlling the pitch of the propeller.

Fig. 5 is an outside, or face view of a part of the propeller with part of the housing broken away for better illustration of interior parts.

Before going into a description of the mechanism, as disclosed in Figs. 4 and 5, the invention will be explained with reference to the illustration of Fig. 3. In this view, the dotted line X represents the prolate cycloidal path generated by a point $p$ on the periphery of an orbit A fixed concentric of a wheel C rolling on plane $c$—$c$. Applying the present construction to the diagram and assuming the orbit A to represent the circle in which the propeller blades of the rotor are mounted, all points in the axes of the blades $b$ rotate for a given instant about the point of contact T of the imaginary wheel C rolling on plane $c$—$c$ without slippage. The curtate cycloid will be normal to a line $l$ between point of contact T and the axis of blade $b$. The plane $f$ of the median chord of the blade will be tangent to the prolate cycloid and therefore normal to the said line $l$.

The present invention takes into consideration the fact that the plane $f$ of the median chord of the blade should be maintained normal to the line $l$ except for a limited compromise whereby blade alinement is corrected for all points on the cycloidal curve thereby providing a very close approach to the pitch ratio of pi.

Referring more in detail to the drawings—

1 designates a supporting frame structure for the propeller. This structure may be embodied in or may constitute a part of the fuselage 2 of the airplane, and fixed therein is a bearing sleeve 3 within which is rotatably mounted the spindle portion 4 of the propeller rotor designated in its entirety by numeral 5.

The rotor is circular and concentric of the spindle 4 and it comprises, at its center, a hub housing 6 with which the spindle 4 is integrally formed. At the outer portion of the rotor a plurality of propeller blade mounting sleeves 7 are supported by brace bars 8; these bars being fixed at their inner ends to flanges 9 on the hub housing 6 and at their outer ends are fixed to the sleeves 7 thereby to rigidly maintain the latter equally spaced apart, also equally spaced from and axially parallel to the axis of the rotor.

Keyed on the inner end of the spindle 4 is a beveled gear 10 and meshing therewith is a beveled driving pinion 11 fixed on the end of a driving shaft 12 that extends from the engine, or source of power, not herein shown; this shaft being rotatably supported adjacent the gear 11 in a bearing 13 that is fixed to frame structure 1.

Rotatably fitted in the several sleeves 7 at the periphery of the rotor are the mounting journals 14 of the propeller blades 15, and at the inner end of each journal is a reduced shank 16 on which a beveled pinion 17, for rotating the blade, is fixed.

Mounted radially of the rotor are blade control shafts 18 revolubly supported at their outer ends in bearings 19 formed integral with the inner end portions of the sleeves 7, and, at their inner ends, extending into the hub housing 6 through supporting bearings 20 integral with the housing. Fixed on the outer end of each shaft 18 is a beveled pinion gear 21 in mesh with the pinion gear 17 of the corresponding blade. Likewise, fixed on the inner ends of the shafts 18 are beveled pinion gears 22 meshing with beveled gears 24 that are located inside housing 6 and keyed on supporting shafts 25; these supporting shafts being rotatably supported at their opposite ends respectively in the inner and outer walls 6$a$ and 6$b$ of the hub housing 6, and are equally spaced apart about the rotor axis and equally spaced from the axis.

Coaxial of the spindle 4 is a tubular shaft 28 revolubly supported in bushings 29 and 30 applied to the spindle ends. At the inner end of the shaft 28 and fixed thereto is a gear 31. At the outer end of the shaft is an adjusting gear 32 in mesh with and normally held against rotation by an intermeshing worm gear 33 on a shaft 34 which provides, as presently understood, for adjustment of the axes of symmetry of the propeller.

Rotatably mounted on each of the several shafts 25 is a gear 35. All of these are of the same diameter and all mesh with the gear 31 to provide a planetary motion thereof about the gear 31, and the relation of diameters of the gears 35 to that of gear 31 is such that, with the gear 31 held against rotation, the gears 35 will be caused to rotate exactly once about their supporting shafts 25 for each rotation of the rotor about its axis.

Each gear 35 has a bevel gear 38 fixed relative thereto at the outer end of its hub portion and this gear is in mesh with spider gears 39 revoluble on spindles 40 that extend radially from the shaft 25 about which the gears 35 and 38 rotate. The spider gears also are in mesh with bevel gears 42 integral with the inner end portions of guide blocks 43 mounted on the outer end portions of the shafts 25.

The gearing arrangement above described provides that with the gears 42 held relatively stationary, for each rotation of the rotor about its axis, the shafts 25, through the mediacy of the spider gears 39 and gears 31, 35 and 38 will be rotated once about their axes for each two rotations of the propeller. Also, the relationship of the gears connecting the shafts 25 and propeller blades is such that the propeller blades will be rotated once with uniform motion about their axes for each rotation of the shaft 25 and therefore once for each rotation of the propeller.

Superimposed upon their uniform rotative motion provided in the gearing above described is an oscillating motion transmitted to the blades by a mechanism embodying the present invention whereby change in pitch of the propeller is effected. This mechanism, as shown in Figs. 4 and 5, comprises a forked bar 48 for each blade mechanism; the forked outer ends of the bars being slidable through their corresponding guide blocks 43 and their inner ends being pivotally mounted on a stud 49 eccentric of the rotor and integral with a cross head 50 that is slidably movable in a guideway 51 in a direction diametrically of the rotor thereby to shift the stud 49 toward or away from the axis of the rotor; the guideway 51 being integral with the gear 31 and held against rotation thereby.

This means of connection provides that, with the stud 49 relatively stationary, and the rotor rotating on its axis, the forked guide bars 48 will cause oscillation of their respective guide blocks 43 both in a clockwise and a counter-clockwise direction for each rotation of the rotor. The spider gears 39 associated with the gears 42 on the blocks cause the shafts 25 to oscillate with half the angular velocity of the oscillating guide blocks, and the relationship of gearing that is intermediate the shafts 25 and their corresponding blades causes the blades, while rotating once about their axes with each rotation of the propeller, to be subjected to oscillations of the same angular velocity of their respective guide blocks 43; the extent of oscillation being determined by the distance of spacing or eccentricity of the stud 49 from the axis of rotation of the rotor and decreases and increases in accordance with the movement of the stud toward and from the axis.

The means for shifting the cross head in its guideway, thereby to shift the eccentric stud, comprises a shaft 60 coaxial of tubular shaft 28 and rotatable in bushings 61 and 62 fitted in opposite ends of shaft 28. At its inner end, shaft 60 has a pinion gear 63 fixed thereon in mesh with a rack 64 on the cross head. At its outer end the shaft 60 is equipped with a worm gear 65 which is held normally against rotation by an intermeshing worm gear 66 on a shaft 67.

Rotation of shaft 66 effects rotation of gear 63 and this, through mediacy of the rack 64, raises or lowers the cross head accordingly and thereby shifts the stud 49 toward or away from the axis of the rotor thereby to regulate the extent of the oscillating action of the blades.

It is apparent that this arrangement of mechanism, as applied to the diagram of Fig. 3, provides for changing the diameter of the imaginary wheel C and therefore controls the pitch of the propeller. Also, since the axis of symmetry is defined as a line drawn through the center of the propeller through the point of contact T, this is controlled by the worm 33, worm gear 32, shaft 28 and gear 31, which mounts the cross head guide 51. Thus by revolving the parts 31, 51, 50 and 49, the axis of symmetry is controlled.

Having thus described our invention, what we claim as new therein and desire to secure by Letters Patent is—

1. In a cycloidal propeller comprising a rotor, a plurality of blades mounted on the rotor to extend substantially normal to the face thereof and means for causing uniform axial rotation of the blades on their axes in accordance with that of the rotor and means for superimposing an oscillating motion on each blade whereby the plane of its median chord will be maintained tangent to a prolate cycloidal path described by the axis of the blade.

2. In a cycloidal propeller comprising a rotor, a plurality of blades mounted on the rotor and extending substantially normal to its surface, means for causing said blades to rotate axially opposite to the direction of and in accordance with rotation of the rotor, and mechanism operable automatically incident to rotation of the rotor whereby an additional oscillatory motion is superimposed on the blades thereby to cause them to be adjusted to maintain the planes of their median chords tangential to the prolate cycloidal paths described by the axis of the blades.

3. In a cycloidal propeller, a rotor, a plurality of blades mounted thereon and extending substantially normal to its plane of rotation, means for imparting a uniform rotative movement to each blade opposite to and in accordance with rotation of the rotor, including a rotatably actuated shaft operatively connected with the blade, and means for superimposing an oscillating action on said shaft whereby the rotative movement of the blade is alternately retarded and accelerated for each half revolution of the rotor.

4. In a cycloidal propeller, a rotor, a plurality of blades mounted thereon and extending substantially normal to its plane of rotation, means for causing said blades to rotate on their axes opposite to the direction of the rotor once for each rotation of the rotor, devices operable to superimpose an oscillating motion on said blade rotating means whereby the planes of the median chords of said blades may be maintained tangential to prolate cycloidal paths described by the axes of blades, and whereby the extent of oscillation may be varied in accordance with change in diameter of the generating circle of the prolate cycloidal path.

5. In a cycloidal propeller, a rotor, a blade arranged thereon for rotation about its axis and extending substantially normal to the plane of rotation of the rotor, a blade rotating means operable incident to rotation of the rotor whereby the blade is caused to rotate about its axis once for each rotation of the rotor and in a direction opposite to that of the rotor; said means including a shaft mounted in the rotor to rotate in accordance with rotative movement thereof and operatively connected to rotate the blade, a block pivotally mounted in the rotor eccentric thereof, a stationary pivot eccentric of the rotor, a slide bar connected with the pivot and with said block whereby rotation of the rotor imparts oscillating motion to the block, and means operatively connecting the block and shaft whereby the oscillating motion of the block is superimposed on the uniform motion of rotation of the shaft.

6. A device, as in claim 5, wherein means is provided for varying the eccentricity of the pivot.

HERBERT M. HEUVER.
KURT F. J. KIRSTEN.